United States Patent
Wheeler et al.

(10) Patent No.: US 9,978,007 B2
(45) Date of Patent: May 22, 2018

(54) THERMAL SCALE RADIO FREQUENCY LABEL

(71) Applicant: Synq Access + Security Technology Ltd., Victoria (CA)

(72) Inventors: Nolan Wheeler, Victoria (CA); Vince Geisler, Victoria (CA)

(73) Assignee: Synq Access + Security Technology Ltd., Victoria, BC (CA)

( * ) Notice: Subject to any disclaimer, the term of this patent is extended or adjusted under 35 U.S.C. 154(b) by 0 days. days.

(21) Appl. No.: 15/399,454

(22) Filed: Jan. 5, 2017

(65) Prior Publication Data

US 2017/0193344 A1    Jul. 6, 2017

(30) Foreign Application Priority Data

Jan. 5, 2016 (CA) .................................. 2916700

(51) Int. Cl.
| | |
|---|---|
| G08B 13/24 | (2006.01) |
| G06K 19/02 | (2006.01) |
| G06K 19/07 | (2006.01) |
| G06K 19/077 | (2006.01) |

(52) U.S. Cl.
CPC ....... *G06K 19/025* (2013.01); *G06K 19/0723* (2013.01); *G06K 19/07756* (2013.01); *G06K 19/07783* (2013.01); *G08B 13/2428* (2013.01); *G08B 13/2451* (2013.01); *G08B 13/2474* (2013.01)

(58) Field of Classification Search
CPC ............................................ G08B 13/24–13/26
See application file for complete search history.

(56) References Cited

U.S. PATENT DOCUMENTS

| | | | | |
|---|---|---|---|---|
| 5,241,299 A | * | 8/1993 | Appalucci | G06K 19/0672 340/572.3 |
| 7,116,227 B2 | * | 10/2006 | Eckstein | G08B 13/2437 340/571 |
| 7,619,530 B2 | * | 11/2009 | Kawamata | G06K 19/07749 29/829 |
| 8,207,824 B2 | * | 6/2012 | Keeton | B41J 3/50 340/10.1 |
| 8,960,558 B1 | * | 2/2015 | MacKenzie | G06K 19/07749 235/492 |
| 9,256,773 B2 | * | 2/2016 | Finn | H01Q 1/2225 |

(Continued)

OTHER PUBLICATIONS http://us.checkpointsystems.com/assets/4010-EP-Food_Label_US.pdf.

*Primary Examiner* — Christle I Marshall
(74) *Attorney, Agent, or Firm* — Davis & Bujold PLLC; Michael J. Bujold

(57) ABSTRACT

A thermal scale radio frequency label which includes a top layer of thermal paper of 20-60 lb weight with an RF antenna mounted on the thermal paper. The RF antenna includes a single turn inductor coil having a width of not less than 5 mm and not more than 13 mm. The inductor coil has a thickness in the range of 30-60 um and covers an area of at least 55×49 mm. A capacitative layer is provided having a thickness in the range of 30-60 um. A dielectric layer is positioned between the capacitative layer and the inductor coil. A plurality of electrical connections are provided between the capacitative layer and the inductor coil. The electrical connections are capable of being deactivated by RF energy.

4 Claims, 1 Drawing Sheet

(56) References Cited

U.S. PATENT DOCUMENTS

| | | | | |
|---|---|---|---|---|
| 2002/0005433 | A1* | 1/2002 | Nochi | G06K 19/07749 235/492 |
| 2009/0002125 | A1* | 1/2009 | Yamaguchi | G06K 19/07718 340/5.1 |
| 2011/0127327 | A1* | 6/2011 | Jensen | G06K 19/077 235/385 |
| 2017/0040665 | A1* | 2/2017 | Takashima | H01Q 7/06 |

* cited by examiner

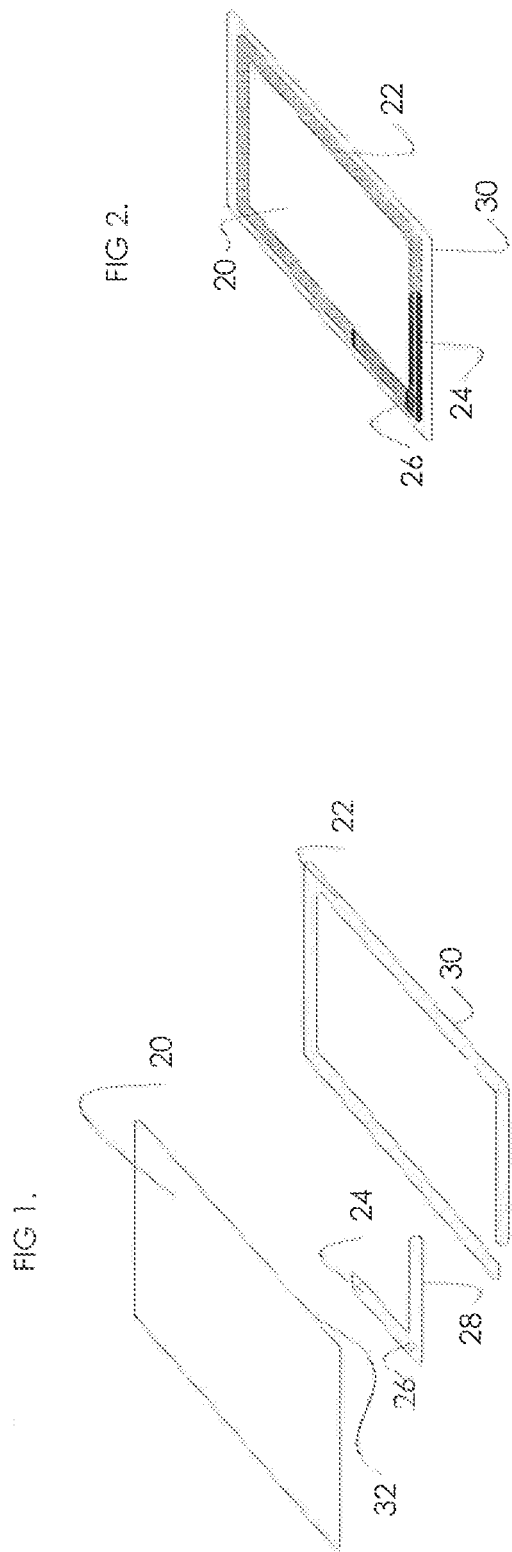

THERMAL SCALE RADIO FREQUENCY LABEL

FIELD

There is described a radio frequency label used with electronic article surveillance to discourage shoplifting of deli and meat grocery items.

BACKGROUND

Over the past 40 years, EAS (Electronic Article Surveillance) has become increasingly popular within retail. Various technologies include AM (acousto-magnetic), RF (radio frequency), EM (electro-magnetic) and to an extent, RFID (radio frequency identification). Each EAS technology has strengths and weaknesses associated with the mechanics of the tag and system, and the relevant frequencies of that technology.

Theft has become much more prevalent over the past decade in North America, due to a number of factors. Primarily this is attributable to increased social issues, social economic imbalances, the judicial system and restrictions placed on it, as well as legislation. All these factors have lead to an increase in the prevalence of shoplifting.

To this day, retail grocery in North America use EAS in grocery retail to a very limited extent. This extent is measurable by (1) the number of retail grocers with EAS, and (2) the number of grocers with EAS that do not use it, or use with limited activity.

Organized Retail Crime (ORC) is a term only gathering momentum over the past 10 years. Retail crime has become big business in North America, as the penalties for retail crime are generally lower than other crimes of similar economic benefit.

A common and prevalent way for those with additions issues to obtain drugs is to trade shoplifted merchandise for their next high. When doing so, those trading obtain approximately 40-50 cents on the dollar for their shoplifted items in trade. Groceries make up a significant amount of items targeted for 'theft for trade' in the street level drug trade. Due to not only the high value of meat and cheese, the demand, relatively high liquidity of the categorical items (many people consume meat and cheese, not everybody needs size 11 sneakers), but that the price of the item is inherently listed right on the artifact. This allows for a less inhibited transaction of the goods as there is no room for argument establishing the market value of the items. In comparison to razor blades or infant formula (other highly stolen items), there is less debate at the time of trade, as razor blades and formula MSRP will change drastically retailer to retailer.

The other factor causing an increase in the theft of grocery, specifically related to meat and cheese/deli, is the commodity driven pricing of the 'sku' (stock keeping unit) price tag. When trading or selling the stolen merchandise, given the thief is 'fencing' to a purchaser, the negotiation needs to be both quick as well as non-confrontational as possible. Meat and cheese/deli, support both attribute of speed and non-confrontation, given the SKU label has the price. In other words, there is no argument about the value-pac steaks being $27.54, but how much is this vanilla, this spice assortment. The fact meat, cheese/deli show the price, supports the 'trade' of the shoplifter relationship. Hence, the thermal scale label that indicates the SKU information and price, attracts shoplifters to these items for logistical (price illustrating) purposes.

SUMMARY

There is provided a thermal scale radio frequency label which includes a top layer of thermal paper of 20-60 lb weight with an RF antenna mounted on the thermal paper. The RF antenna includes a single turn inductor coil having a width of not less than 5 mm and not more than 13 mm. The inductor coil has a thickness in the range of 30-60 um and covers an area of at least 55×49 mm. A capacitative layer is provided having a thickness in the range of 30-60 um. A dielectric layer is positioned between the capacitative layer and the inductor coil. A plurality of electrical connections are provided between the capacitative layer and the inductor coil. The electrical connections are capable of being deactivated by RF energy.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is an exploded perspective view of a thermal scale radio frequency label.

FIG. 2 is a perspective view of the thermal scale radio frequency label of FIG. 1.

DETAILED DESCRIPTION

A thermal scale radio frequency label will now be described with reference to FIG. 1 and FIG. 2.

Structure and Relationship of Parts:

At the onset, the problem to overcome was to research the retail grocery landscape and the operational similarities of meat and deli department artifacts. Various packaging solutions were considered such as foam trays, absorption mats, etc. However, all of these solutions had grave impacts to food safety standards, impacted (moisture) the EAS technologies in many tests, and created potential issues with those who still microwave their product as part of defrosting from cold storage. Moisture and other characteristics associated with deli and meat grocery items also had an impact of EAS technologies. In addition, the extensive list of various sizes, specifications and unique requirements from retailers were so vast, that producing this many sku's became detrimental to the production of the solution. The inventor wanted to ensure that things of great value in the shoplifting and ORC community would become the security itself In this case, the price tag of the artifact is a critical component to the resale and trade logistics. Thus, incorporating the security into the pricing label had great benefit.

The placement of the EAS label within the packaging also brings up concerns. The first concern is that these labels are not food safe compliant, somewhat exempt from food safety packaging requirements. The food safety issues range from the label itself not being sterile, being made of materials listed as known carcinogens, and the health concerns of the tag reacting in the microwave under the product releasing further toxins.

It was then considered to incorporate EAS into the thermal label, in other words the price tag, of the meat and/or deli items. Consultation with various thermal scale printing device manufacturers engineering teams then commenced, understanding the restrictions and requirements of an EAS label in terms of thickness, the incorporation of metals, service life concerns, pressure sensitive glue, glue thickness, along with properties such as readability and print quality.

Of the 4 potential EAS technologies available to incorporate into the items, AM was ruled out due to the mechanical constraint that any pressure or damage to the tag itself, would render the tag incapacitated. When observing the readability of RFID, it was determined from a frequency perspective that the RFID would not lend itself to effective detection rates in a loss prevention setting. The increase capacitance of the tag, directly on the meat or cheese (high water and high salt) caused readability issues. What was left was the technologies of EM and RF. The EM tag was the natural winner at first, in that, it did not have shielding issues associated with moisture and salt water content.

Both RF and EM labels were produced as prototypes, each with various differences. It was advised by scale printer engineering that label thickness was critical to the printer mechanics (a correlation of temperature and pressure applied supported print quality). This was also echoed by the largest label manufactures in North America. When operating within the restrictions placed on the inventor by the scale printing manufacturers, label print quality was very low. The print head did not apply consistent images to the thermal paper, causing barcodes to be unreadable, and general aesthetics of the label to be rejected by the retailers. This of course the opposite of a traditional EAS label specification as where the thickness of the antenna was in direct positive relationship with detection or pick rate metrics.

Construction of an EM TSL (electro-magnetic thermal scale label) commenced and the label going through various versions was observed as an effective solution. However, long term testing showed the label damaged the thermal print head of the printer due to repetitive contact of the EM amorphous wire along the entire length of the label. The thickness of the material (totalling an additional 75 um) in the same consistent spot attributed to this print head damage. In addition, the EM environmental requirements for system performance were observed in North America as very challenging (deemed inoperable long term). This caused the inventor to move from EM, which at the onset was the preferred material technology, to RF. Given the required exist distances, the effective yield from the amorphous was inadequate for grocery and mass merchandizer ingress and egress builds. Further, the deactivation methodologies for EM and the detection limitations of EM within high volume grocery setting, deemed EM technology unsuitable.

RF (radio frequency) labels of traditional design and size struggle to work effectively on meat due to the characteristics of the meat having high moisture, high salt water content, causing the labels to be detuned. Further, the industry spoke to the relative previous 30 years of failure leading RF companies had with using RF labels on meat products. It was against the advice of the industry, that the inventor set out to develop and manufacture of the industry's first Thermal Scale Radio Frequency Label (TSRFL).

Applying the learning of EM Thermal Scale Label design to that of RF, the first prototype labels were designed using standard RF coils at standard thicknesses (inductors in excess of 80 um), using standard thermal direct paper. After various failures, the first printable prototype was tested in Early 2015. The results were mixed, whereby labels that did work, worked incredibly well, however, labels would actually deactivate as they entered the RF field of the antenna (rendering the tags and concept useless). In addition, print quality was poor, whereby print would only appear on either of the raised 80 um antenna and capacitor, or only within the internal space containing the coil. This product is required to not only be an effective EAS label, but also must print to the same standards of a traditional thermal scale label. Further, detuning of labels was forefront relative to concerns. Given the placement of the RF label on the meat or cheese, the shift of frequency away from the required turning (in this instance 8.2 MHz) were so vast, that the system detection ignored the presence of the resonance given it was too far from the 8.2 MHz required resonance.

Thus, three primary issues had to be overcome:
1. Overcoming detuning;
2. Improved print quality;
3. Overcome deactivation/reactivation related issues specific to large RF coil structures with strong detection of large entrances.

The feedback from the print and label manufacturing community was to make the label top stock thicker. By increasing the top stock, the percentage change (variance change high to low) in thickness would be reduced, and the label would be seen as 'more consistent' from the perspective of 'high points' and low points'. These labels were manufactured as test, and although the labels were now much smoother, printing results worsened. The problem was later identified that, as the label became thicker, the print head and print roller became less effective at applying enough pressure for reliable printing.

The inventor then looked at reducing the thickness of the paper, adhesives and the coil itself, causing the inventor to use very thin (for the industry) a 50 um coil and increasing the size of the inductor (these are the largest RF labels ever produced in the world). Testing of the coil resulted in only slight deterioration of pick rate and distance from antenna in the orientations of face, flat and side. A traditional RF label would have observed a very large loss of detection due to the change of coil thickness from 80 um to 50 um, however, the sheer size of the TSRFL allowed for the reduction, whereby tag size compensated for the lack of thickness (mass).

Paper was selected with thinner properties (papers ranging from 105 to 40 lbs were tested). In addition, various thermal coatings were then tested across the paper thicknesses. Counter to the advice of the industry, the labels with the thinner paper printed more effectively, as the print head was applying more pressure to the thermal top stock (the paper top stock having to disperse less pressure through the thicker papers).Thinner labels, however, increased variance of thickness between label thickness at coil versus label thickness at the centre of the label where no coil was present.

Labels were also very challenging to deactivate, would deactivate inadvertently at the antenna, or would reactivate following deactivation; another aspect of the large size. Deactivation was a critical component of the tag, as with the simplicity and ease of tagging items, stores are required under this label model to deactivate many more items per 1000 than traditionally with standalone EAS labels. Manipulation of the traditional methods of dimpling (the process that supports the deactivator whereby the coil impacted resulting in deactivated or intentionally detuned labels), were then adjusted to support deactivation. However, during application testing in real-store environmental surroundings, it was found that although the tags were very large in size and much higher in Q factor, there were instances of detuning (increase capacitance caused by the salt/water content in the meat/cheese). The shift in frequency would cause the label to be outside the scope of the RF antenna and the tag would fall into a fail criteria. Efforts were made to adjust the centre of resonant frequency to compensate for the anticipated capacitance, but this too failed given the infinite combinations of meat capacitance (thickness, structure, moisture, salt, etc.) and the relative placement of the RF label. Various solutions were sought to defeat the capacitance shift with different liners including those with attractive dielectric properties to prevent and/or reduce the shift, or the addition of using a ground plane.

The outcome of further development and testing was to use a LC tank circuit, whereby rather than a loop of wire (inductor), electrically shortened by the addition of a capacitor, the use of a less conventional design was adopted to combat the parasitic capacitance of the artifacts being protected (meat/cheese/deli). When the traditional RF LC tank design is applied to meat, because the meat creates greater distributed capacitance (large parasitic capacitance which detunes the resonant frequency out of read range) the tag again failed in real world application. This tag is multi-turn inductor, and has high resistive loss. What was required, was to reverse the logic. Rather than using a large inductive coil and a small capacitor, the design required a much larger capacitor whereby this results in distributed capacitance, reducing the problems of parasitic capacitance which is caused by meat/cheese/deli.

The design thus calls for capacitance, as a ratio, to become greater than the parasitic capacitance of the artifacts. Unable to avoid the parasitic capacitance of the artifact, resulted in an increase in the designed capacitance. By having less turns of the inductor, there can be a larger capacitor, thus there is less surface area of the coil to have increased parasitic capacitance between the designed capacitance of the tag and the capacitance of the meat. This creates higher Q, shielding itself from the external capacitance (meat/cheese/deli).

In addition, using a wider inductor vs. the thin traces of the traditional coil, the wider band (thickness) increases the Q (L to C ratio). The wider inductor has less resistance losses. In addition, the increase in the surface area and geometry of the tag, we attract more electromagnetic flux resulting higher Q. This uniquely and additionally increase in flux which increases the energy density, slower tag energy decay, and thus a tag with not only high Q but higher energy. The combination of increase Q and flux results in a much higher performing tag, allowing for much larger distances between readers, specifically required in grocery, mass merchandising, etc. Therefore, the design is a single turn, a wider inductor (lower restive loss), high flux (energy density, slower tag energy decay). This can only be achieved on the design of a TSRFL whereby the size of the tag and application of the tag into retail permits its size per the pre-existing use of the thermal scale label component.

The aggregate result of the work was a label with high performance on meat/cheese/deli items, with the largest pick rate of an EAS label ever produced. The design, geometry, size, materials selected, resulted in high Q, high flux, pick and performance, as well as the ability to work through a thermal print head. Referring to FIG. 1, the final version of TSRFL included top layer of thermal paper 20. Thermal paper 20 may either be coated. A single turn wide inductor coil 22, having a width that is not less than 5 mm and not more than 13 mm. If the width is less than 5 mm, problems may be encountered the ability to generate sufficient flux. If the width is more than 13 mm, problems may be encountered with the ability to generate sufficient capacitance. Capacitative layer 24 provides distributed capacitance to form the RF label resonant signature. Reference numeral 26 identifies dimpling that electrically connects capacitive layer 24 and inductor coil 22. This forms an electrical connection that can be more easily deactivate. Reference numeral 28 identifies an insulated dielectric, required to create capacitance on the inductor coil 22. Reference numeral 30 identifies an adhesive backing of the label (at times supported by a carrier). Reference numeral 32 identifies an adhesive backing on thermal paper 20. This laminated "sandwich" is then applied to a release liner that may or may not have a printed registration indicator for an optical sensor of a label printer.

Referring to FIG. 2 illustrates the final label as described in FIG. 1, with thermal paper 20, dimpling 26, distributed capacitance layer 24, inductor coil 22. With the attachment to a product being accomplished by adhesive backing 30.

As discussed above, in order to guard against print failure a label that is "thinner" should be used. In this regard the coil thickness of the antenna (RF EAS) should be in a range of 30-60 um. Further, paper thickness should be in a range of 20-60 lb weight. If below the lower end of the range of the aforementioned in thickness the label is too fragile and will not withstand the rigours of the application and/or provide inadequate detection. If the label exceeds the upper end of the range aforementioned in thickness, print problems will be encountered as have outlined above.

As discussed above, in order to guard against failure the label should be "oversized". That is to say the label should have a dimensional area of at least 57×49 mm, so that the antenna size can overcome the problems outlined above in relation to working in close proximity to meat and other products with shielding properties.

Operation:

The TSRFL tag operates as a single application tag that holds RF inlay in the form of inductor coil 22 with a thermal paper 20 stock. The thermal paper 20 stock supports logistics, point of sale, authentication, etc. The RF component of the tag, is used for security of the artifact.

Where it may demonstrate economic benefit to EAS protect clothing, this same logic does not reign true for retail grocery. The factors involved in the economic disparity are (1) value of the artifact (2) gross profit of the artifact (3) inventory turns (days on hand) and (4) employee cost to net profit ratio. Where it may culturally become common sense to hard tag EAS protect clothing, this same logic does not reign true for retail grocery. Cultural perceptions of theft are related to higher value items, not every day consumables. Where stores have EAS installed, the number of items tagged is generally very low, and culture and workplace performance pressures put EAS tagging as a low priority. Compliance is a costly endeavor, conducted by store visits, audits, and POS data.

The present invention gets around this bias by making the EAS protection part of the operational process already adopted. For each item priced, is an item protected. Compliance is no longer required, as each item inevitably must be priced or order to be sold.

The global economy is becoming more and more sensitive to environmental concerns and awareness. Even within the EAS vertical itself, manufacturers of EAS systems are competing with energy efficiency statistics in order to drive sales and differentiate product. However, no supplier of EAS tags has marketed or evaluated the environmental cost of EAS tags in our landfills. EAS tags, being comprised of both paper and metal substrates are non-recyclable, ending up in our land fields. By laminated and/or incorporating the EAS mechanics into an existing label already part of the retail process, tons of excess garbage can be negated from our landfills due to the excess paper, adhesive, and liner of 2 retail labels on one product.

When observing retail theft within the retail grocery vertical, of the top 7 highest shrinking categories, items with a thermal scale label make up 5 of those 7 categories (Cheese, Meat Regular, Seafood, Deli, and Meat Specialty). This according to the Center for Retail Research (2011). Additionally, it is know that items with thermal scale labels (prices) are targeted by criminals who trade stolen artifacts for drugs.

Variations:

The TSRFL tag includes the RF components of the tag applied to a thermal paper top stock. The frequency and design of the RF tag covers the RF EAS frequency range. At times there may be applications where continuous TSRFL labels are produced, whereby the coil (antenna) of the label is also continuous, and the thermal printer tear bar would separate labels during labeling processes. A continuous, linerless label is also a possible variation.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A thermal scale radio frequency label, comprising:
    a top layer of thermal paper of 20-60 lb weight;
    an RF antenna mounted on the thermal paper, the RF antenna comprising:
        a single turn inductor coil having a width of not less than 5 mm and not more than 13 mm, the inductor coil having a thickness in the range of 30-60 um and covering an area of at least 55×49 mm;
        a capacitative layer having a thickness in the range of 30-60 um;
        a dielectric layer between the capacitative layer and the inductor coil; and
        a plurality of electrical connections between the capacitative layer and the inductor coil, the electrical connections being capable of being deactivated by RF energy.

2. The thermal scale radio frequency label of claim 1, wherein the capacitative layer is of aluminium.

3. The thermal scale radio frequency label of claim 1, wherein the inductive coil is of aluminium.

4. The thermal scale radio frequency label of claim 1, wherein the electrical connections are achieved by dimpling.

* * * * *